No. 764,814. PATENTED JULY 12, 1904.
A. A. KENT.
ELECTRIC MEASURING INSTRUMENT.
APPLICATION FILED NOV. 21, 1903.
NO MODEL.
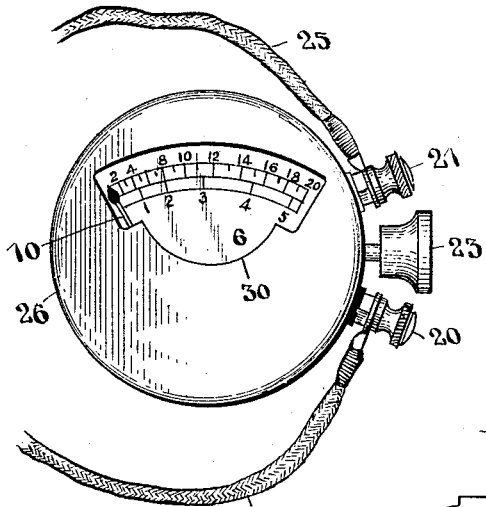
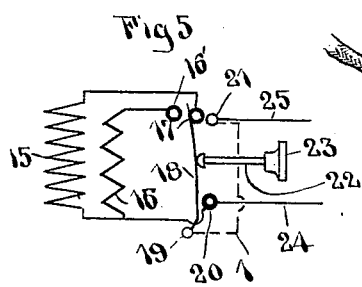
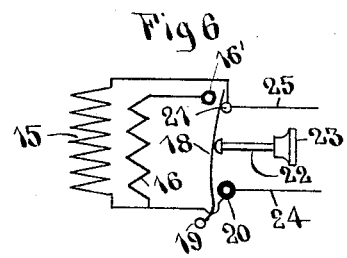
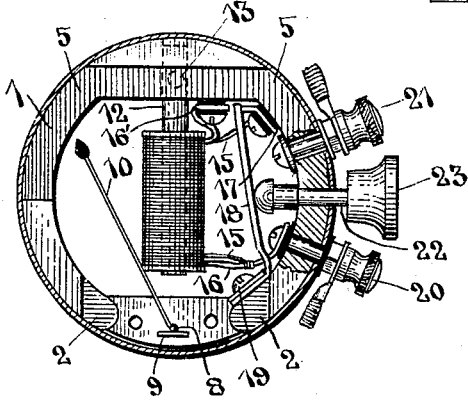
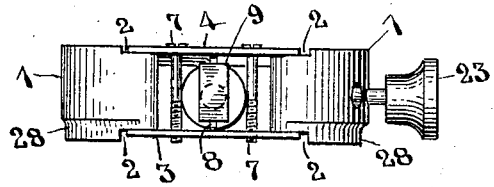
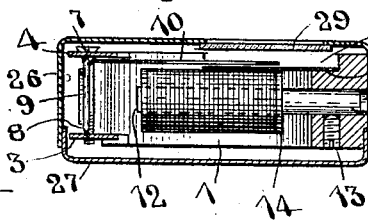
WITNESSES
INVENTOR
Arthur A. Kent.
by Edw. W. Vaill Jr.
Attorney No. 764,814. Patented July 12, 1904.

UNITED STATES PATENT OFFICE.

ARTHUR A. KENT, OF PHILADELPHIA, PENNSYLVANIA.

ELECTRIC MEASURING INSTRUMENT.

SPECIFICATION forming part of Letters Patent No. 764,814, dated July 12, 1904.

Application filed November 21, 1903. Serial No. 182,087. (No model.)

*To all whom it may concern:*

Be it known that I, ARTHUR A. KENT, a citizen of the United States, and a resident of Philadelphia, State of Pennsylvania, have invented certain new and useful Improvements in Electric Measuring Instruments, of which the following is a full, clear, and complete disclosure.

The object of my invention is to provide such an instrument for measuring the potential and strength of electric currents that both of such conditions may be determined by one and the same instrument.

Another object of my invention is to provide means for regulating the strength and position of the magnetic field, so that the instrument may be accurately calibrated and adjusted.

Other objects are also attained by my invention, which will hereinafter be pointed out.

Briefly, my invention embodies a permanent magnet between the poles of which is pivoted an armature to which an indicator or pointer is attached. The permanent magnet is also provided with a secondary projecting core which carries the fine and coarse wire coils for the volt and ampere meters, respectively, and which serve to distort the permanent magnetic field according to the current to give the readings. A switch is also provided for throwing either one of the coils into operation.

For a full, clear, and exact description of embodiments of my invention reference may be had to the following specification and to the accompanying drawings, forming a part thereof, in which—

Figure 1 is a plan view of my improved electrical measuring instrument; Fig. 2, a similar view showing the top or cover removed, together with the indicator-card; Fig. 3, an end view of the magnet with the casing removed; Fig. 4, a central sectional view, and Figs. 5 and 6 diagrammatic views of connections.

Referring to the drawings, the numeral 1 indicates a horseshoe or C shaped magnet, having a permanent magnetic field. This magnet has recesses 2 adjacent its ends to receive two non-magnetic pole-plates 3 and 4 and a recess 5 to receive the scale-card 6. The pole-plates 4 and 5 are connected and held in position by means of the screws 7. A vertical rod or pin 8 has bearings in the plates 4 and 5 and carries the armature 9, which is preferably a small steel or iron plate in the shape indicated. A pointer 10 is also attached to the pin 8 and extends over the scale-card 6.

In the central or yoke portion of the permanent magnet 1 I provide an opening 11, which receives one end of a core 12, preferably of soft iron, which is adjustably retained within the opening or recess by means of a set-screw 13. The core 12 carries the spool 14, on which is wound the fine and coarse wire coils 15 and 16. One end of the coarse-wire coil 16 is attached to the insulated terminal 16', which forms one member of a switch, as indicated. The other member of this switch is in the form of a spring-plate 18, attached to and in electrical connection with the body of the magnet, as indicated at 19. The other end of the coarse-wire coil is attached to the insulated terminal or binding-post 20. An uninsulated terminal or binding-post 21 is carried by the magnet 1. One end of the fine-wire or voltmeter coil 15 is connected with the insulated switch member 17, while its opposite end is connected with the corresponding end of the coarse-wire coil and is therefore in connection with the binding-post 20. A plunger or slidable pin 22, having a head or button 23, serves as means for forcing the switch member 18 inward against the insulated switch member 16' to close the circuit through the coarse-wire coil 16. Normally the movable switch member 18 rests against the insulated switch member 17 to close the circuit through the fine-wire coil 15 when the instrument is being used as a voltmeter, as shown in Fig. 5. Of course it is obvious that one end of the fine-wire coil 15 might be connected to the insulated terminal 16' and one end of the coarse-wire coil with the insulated terminal 17, in which case the coarse-wire coil would be normally in circuit, the fine-wire coil 15 being thrown in by pressing the button to operate the switch.

The insulated terminal 17 may be omitted, as shown in Fig. 6, in which case the fine-wire coil 15 would always be in circuit by being grounded on the magnet 1, preferably at the binding-post 21, and the instrument therefore would normally be in condition for use as a voltmeter. By operating the switch the coarse-wire coil would be thrown into circuit as a shunt to the fine-wire coil.

Preferably the binding-posts 20 and 21 are connected with suitable flexible or cord connectors 24 and 25, which may be included in the circuit to be tested or may be attached to the poles of a battery for testing the same.

The card 6 is provided with two scales for reading volts and amperes, respectively.

The casing is made in any suitable manner; but I have shown it as consisting of two telescoping parts 26 and 27, the inner one, 27, of which enters an annular recess 28 in the magnet 1. A cover-glass 29 closes the opening 30 in the casing.

One of the important features of my invention is in providing the adjustable core 12, having the coils 15 and 16 thereon. This permits the intensity of the distorting magnetic field from the core 12 to be so controlled that the instrument may be calibrated without other changes and alterations, it being necessary only to adjust the said core inward or outward until the correct readings are obtained by the pointer 10 upon the scale 6.

Among the special advantages of these forms of my improved measuring instruments is that of their adaptability, convenience, and efficiency when used in connection with batteries composed of dry cells or similar cells of other small batteries which need replacing or replenishing at intervals, and therefore require to be tested. The very large and extended use of these small batteries has made my instruments a necessity, which has not heretofore been filled successfully. By the use of my instruments the internal resistance of a battery may be easily found in the well-known manner by measuring the current through the known resistance of the coarse-wire coil or other known resistance, for which purpose the electromotive force or voltage may also be easily determined.

In the use of my instrument, the connectors 24 and 25 being attached to the desired points, the current flows through the coil 15, terminal 17, spring 18, and magnet 1 from the binding-posts 20 and 21, this condition being that for the voltmeter-reading, as shown in Fig. 5. When it is desired to use the instrument as an ampere-meter, the button 23 is pressed inward, thus causing the spring 18 to contact with the terminal 16', which throws the coarse-wire coil into circuit. The current then passes from the binding-post 20 through the coarse-wire coil 16, terminal 16', spring 18, magnet 1 to the binding-post 21.

When the form shown in Fig. 6 is used as a voltmeter, the current flows through the coil 15 from the binding-posts 20 and 21. When this form is used as an ampere-meter, by pressing the button 23 the current then passes from the binding-post 20 through the coarse-wire coil 16, terminal 16', spring 18, magnet 1 to the binding-post 21, or the reverse, depending upon how the coil is wound and how the magnet is polarized.

It will be noticed that when the coarse-wire coil is in circuit the fine-wire coil is also in shunt with it; but its resistance being comparatively much greater than the former the current consumed is negligible and does not affect the reading of the instrument as an ampere-meter.

The arrangement of the coarse-wire coil and the switch for throwing the same into circuit constitutes another important feature of my invention among others.

I do not wish to be limited to the details of form and arrangement of parts herein set forth, for different embodiments of my invention may be made without departing from the spirit and scope thereof; but

What I claim, and desire to protect by Letters Patent of the United States, is—

1. In a measuring instrument, the combination with a permanent magnet having a projection intermediate its poles, of a coil for energizing said projection to distort the permanent magnetic field according to the flow of current in said coil, and means for indicating the amount of distortion of said field.

2. In a measuring instrument, the combination with a horseshoe-magnet having a projection midway of its poles and extending toward the latter, of a coil for energizing said projection to distort the field of said magnet, and means for indicating the amount of distortion of said field.

3. In a measuring instrument, the combination, a horseshoe-magnet, a radial projection carried by and extending from the central portion thereof and adapted to create a field at right angles to the permanent field, a coil for energizing said projection, an armature, and means for indicating the position of said armature.

4. In a measuring instrument, the combination with a permanent magnet of an adjustable core secured thereto, means for energizing said core to distort the field of said magnet, and means for indicating the change in said field.

5. In a measuring instrument, the combination with a permanent horseshoe-magnet, of an adjustable soft-iron core projecting from the central portion thereof, a coil for energizing said core, and means for indicating the change caused by said core, in the permanent field.

6. In a measuring instrument, the combination with a permanent horseshoe-magnet, of an adjustable soft-iron core projecting therefrom, a coil, an armature, pivoted adjacent the end of said core, and means for indicating the position of said armature.

7. In a measuring instrument, the combination with a permanent horseshoe-magnet, of a soft-iron core adjustably carried thereby, a plate of magnetic material pivoted adjacent the poles of said magnet and the end of said core, means for energizing said core, and an indicator connected with said plate.

8. In a measuring instrument, the combination with a permanent C-shaped magnet, of a soft-iron core adjustably carried thereby and extending on the central diameter, means for energizing said core, an armature, and means for indicating the position of said armature.

9. In a measuring instrument, the combination, two fixed terminals, a fine-wire coil, a coarse-wire coil, and a movable switch member fixed on said instrument for making either of said coils effective.

10. In a measuring instrument, the combination, two fixed terminals, a fine-wire coil, a coarse-wire coil, and a switch fixed in relation to said instrument adapted to put said coils in circuit for making either of said coils effective.

11. In a measuring instrument, the combination, a fine-wire coil, a coarse-wire coil, two terminals fixed on the instrument, and a switch contained within the instrument and connected with one of said terminals for making either of said coils effective by current from said terminals.

12. In a measuring instrument, the combination, a coil for measuring volts, a coil for measuring amperes, two terminals fixed on the instrument, two insulated switch members connected to the coils for measuring amperes and volts respectively, a movable switch member for contacting with said switch members for making the coils for measuring amperes and volts effective.

13. In a measuring instrument, the combination, a coil for measuring volts, a coil for measuring amperes, two terminals fixed on the instrument, switch members respectively connected to said coils, and a movable switch member for contacting with said switch members, for making either of said coils effective.

14. In a measuring instrument, the combination, a fine-wire coil, a coarse-wire coil, two terminals fixed on the instrument, a fixed switch member connected to the coarse-wire coil, a movable switch member for contacting with said fixed switch member for throwing said coarse-wire coil into circuit.

15. In a measuring instrument, a fine-wire coil, a coarse-wire coil, and a switch for putting one of said coils in shunt with the other of said coils.

16. In a measuring instrument, a fine-wire coil, a coarse-wire coil, and a switch contained within said instrument for putting one of said coils in shunt with the other of said coils.

17. In a measuring instrument, a fine-wire coil, a coarse-wire coil, and a switch contained within said instrument for putting said coarse-wire coil in shunt with said fine-wire coil.

18. In a measuring-instrument, a permanent magnet, an adjustable core carried thereby, fine and coarse wire coils for energizing said core, and a switch mounted on said magnet for putting one of said coils in shunt with the other.

19. In a measuring instrument, a fine-wire coil, a coarse-wire coil, fixed terminals for said fine-wire coil, a switch for putting said coarse-wire coil in shunt with said fine-wire coil.

20. In a measuring instrument, a horseshoe-magnet, a fine-wire coil, a coarse-wire coil, and a switch carried on the inner surface of said magnet for putting said coarse-wire coil in shunt with said fine-wire coil.

21. In a measuring instrument, a horseshoe-magnet, a fine-wire coil, a coarse-wire coil, an insulated terminal for said coarse-wire coil carried by said magnet, and a movable member attached to said magnet and adapted to put said coarse-wire coil in shunt with said fine-wire coil by contacting with said insulated terminal.

22. In a measuring instrument, a fine-wire coil, a coarse-wire coil, an insulated terminal to which one end of each coil is connected, a second insulated terminal to which the other end of said coarse-wire coil is connected, a third terminal to which the other end of said fine-wire coil is connected, a switch member in connection with the latter, and means for forcing said switch member against said second insulated terminal.

23. In a measuring instrument, a horseshoe-magnet a fine-wire coil, a coarse-wire coil grounded upon said magnet, an insulated binding-post to which one end of each coil is connected, an insulated switch member to which the other end of said coarse wire is connected, a second binding-post mounted upon said magnet, a spring mounted upon said magnet, and means for forcing said spring against said insulated switch member.

In testimony whereof I have set my hand, in the presence of two witnesses, this 20th day of November, 1903.

ARTHUR A. KENT.

Witnesses:
JOHN F. GRADY,
EDWARD W. VAILL, Jr.